United States Patent
Shr et al.

(10) Patent No.: US 11,481,347 B2
(45) Date of Patent: Oct. 25, 2022

(54) DATA TRANSMISSION SYSTEM AND RESOURCE ALLOCATION METHOD THEREOF

(71) Applicant: REALTEK SEMICONDUCTOR CORPORATION, Hsinchu (TW)

(72) Inventors: Kai-Ting Shr, Hsinchu (TW); Min-Yen Hsieh, Hsinchu (TW); Chia-Wei Yu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 107 days.

(21) Appl. No.: 17/039,493

(22) Filed: Sep. 30, 2020

(65) Prior Publication Data
US 2021/0240647 A1 Aug. 5, 2021

(30) Foreign Application Priority Data
Feb. 3, 2020 (TW) ................. 109103218

(51) Int. Cl.
| G06F 13/36 | (2006.01) |
| G06F 13/362 | (2006.01) |
| G06F 9/50 | (2006.01) |
| G06N 3/02 | (2006.01) |

(52) U.S. Cl.
CPC .......... G06F 13/362 (2013.01); G06F 9/5011 (2013.01); G06N 3/02 (2013.01)

(58) Field of Classification Search
None
See application file for complete search history.

(56) References Cited

U.S. PATENT DOCUMENTS

| 10,048,987 B1 * | 8/2018 | Graham | ................ G06F 9/5011 |
| 2012/0041914 A1 | 2/2012 | Tirunagari | |
| 2014/0047148 A1 | 2/2014 | Mace | |
| 2019/0130246 A1 * | 5/2019 | Katayama | ............ G06N 3/063 |

* cited by examiner

*Primary Examiner* — Scott C Sun
(74) *Attorney, Agent, or Firm* — WPAT, P.C., Intellectual Property Attorneys; Anthony King

(57) ABSTRACT

The present invention provides a data transmission system and resource allocation method thereof. The data transmission system is configured to: retrieve master device resource information and slave device performance information; based on a neural network model, determine at least one arbiter setting parameter according to the master device resource information and the slave device performance information; and determine resource allocation setting of at least one master device according to the at least one arbiter setting parameter.

20 Claims, 7 Drawing Sheets

DATA TRANSMISSION SYSTEM AND RESOURCE ALLOCATION METHOD THEREOF

CROSS REFERENCE TO RELATED APPLICATIONS

This application claims priority of Taiwan application No. 109103218 filed on Feb. 3, 2020, which is incorporated by reference in its entirety.

BACKGROUND

Field of the Invention

The present invention relates generally to a data transmission system and a resource allocation method thereof, more particularly, to a data transmission system and a resource allocation method thereof for setting arbiter dynamically.

Description of Related Art

In the conventional technology, the arbiter determines the order in which the master device accesses the slave device according to the resource requirements of the master device. Therefore, the setting of the arbiter will affect the data transmission efficiency.

However, in the existing data transmission process, the setting of the arbiter cannot be changed after the setting has been done. Even in the case of fine-tuning the setting, the contents that need to be adjusted shall be determined and inputted manually, followed by restarting the system. This is a waste of the operation time and also leads to worse data transmission efficiency.

BRIEF SUMMARY OF THE INVENTION

Some embodiments of the present invention provide a resource allocation method. The resource allocation method includes: retrieving master device resource information associated with at least one master device and slave device performance information associated with at least one slave device; determining at least one arbiter setting parameter based on a neural network model according to the master device resource information and the slave device performance information; and determining an order in which the at least one master device accesses the at least one slave device according to the at least one arbiter setting parameter.

Some embodiments of the present invention provide a data transmission system. The data transmission system includes: an arbiter parameter generating module and an arbiter. The arbiter parameter generating module includes: a processing unit and a storage unit. The storage is configured to store a neural network model and a program, wherein the program, upon execution, causes the processing unit to: retrieve master device resource information associated with at least one master device and slave device performance information associated with at least one slave device; and determine at least one arbiter setting parameter based on a neural network model according to the master device resource information and the slave device performance information. The arbiter is electrically connected to the arbiter parameter generating module, and configured to determine an order in which the at least one master device accesses the at least one slave device according to the at least one arbiter setting parameter.

Some embodiments of the present invention provide an arbiter parameter generating module. The arbiter parameter generating module includes: a processing unit and a storage unit. The storage is configured to store a neural network model and a program, wherein the program, upon execution, causes the processing unit to: retrieve master device resource information associated with at least one master device and slave device performance information associated with at least one slave device; and determine at least one arbiter setting parameter based on a neural network model according to the master device resource information and the slave device performance information.

BRIEF DESCRIPTION OF THE DRAWINGS

Aspects of the present invention are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Embodiments of the present invention are discussed in detail below. It should be appreciated, however, that the present invention provides many applicable inventive concepts that can be embodied in a wide variety of specific contexts. The specific embodiments discussed are merely illustrative and do not limit the scope of the disclosure.

Figure 1A:
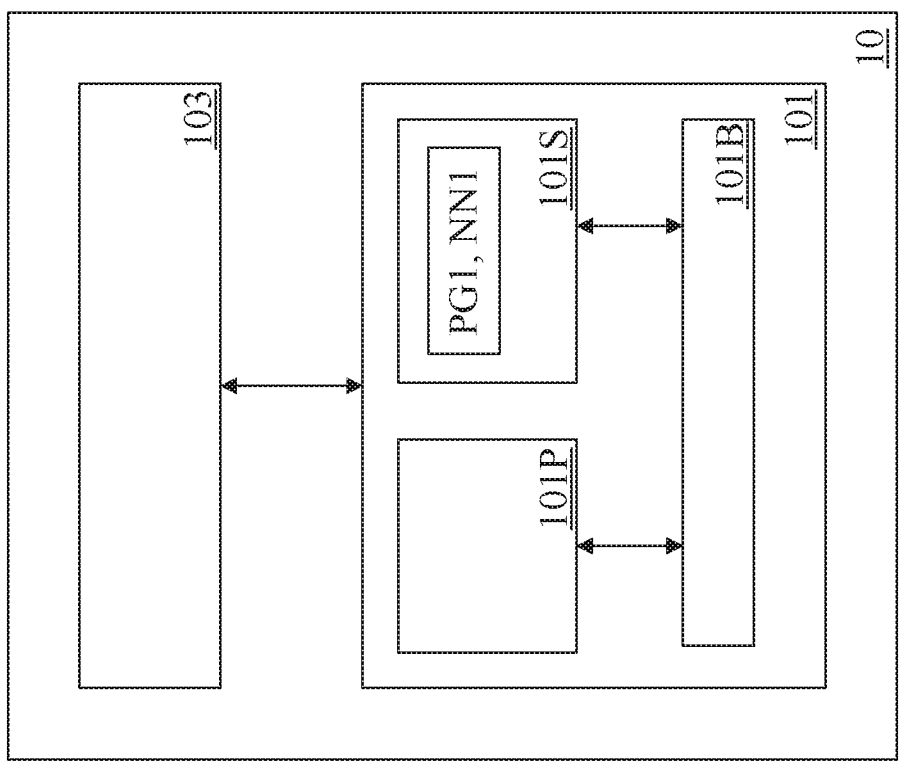
FIG. 1A is a block diagram of a data transmission system according to some embodiments of the present invention.

In order to dynamically adjust setting parameters of arbiter according to the real-time data transmission status between master device and slave device, so as to improve the access efficiency, the present invention provides a data transmission system 10. Please refer to FIG. 1A, which is a block diagram of a data transmission system 10 according to some embodiments of the present invention. The data transmission system 10 includes an arbiter parameter generating module 101 and an arbiter 103.

The arbiter parameter generating module 101 includes a processing unit 101P and a storage unit 101S. The processing unit 101P and the storage unit 101S are electrically connected via a bus 101B. By the bus 101B, the processing unit 101P can execute a program PG1 stored in the storage unit 101S. The execution of the program PG1 causes the processing unit 101P to execute the function of dynamic resource allocation. The relevant function of dynamic resource allocation is discussed further below.

Figure 1B:
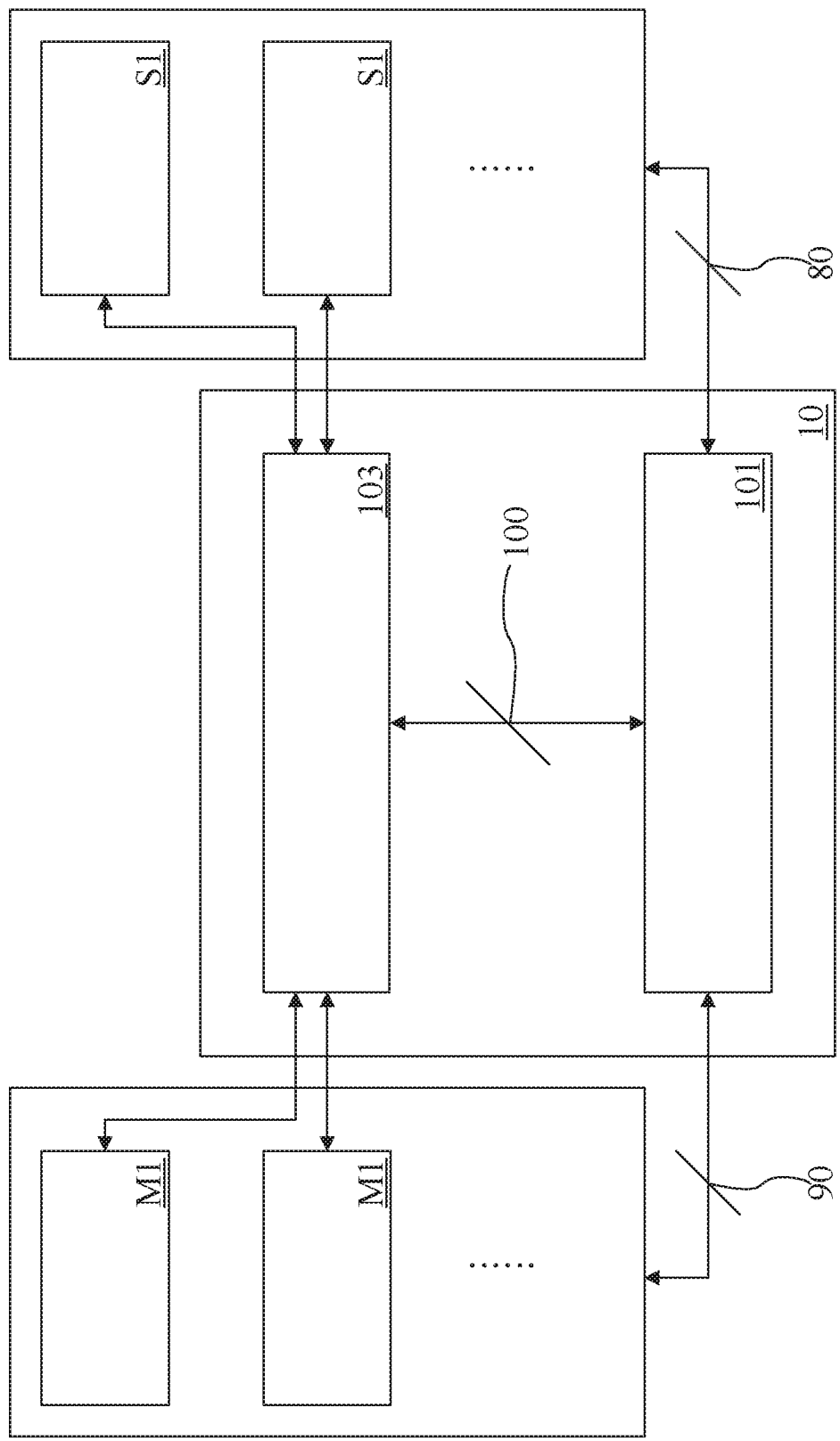
FIG. 1B is a schematic diagram illustrating a data transmission system according to some embodiments of the present invention.

Please refer to FIG. 1B, which is a schematic diagram illustrating the data transmission system 10. As shown in the drawing, the arbiter 103 of the data transmission system 10 is electrically connected to at least one master device M1 and at least one slave device S1 via a data transmission interface (not shown). The arbiter 103 is configured to allocate resource of at least one slave device S1 to the at least one master device M1 according to access requirement of the at least one master device M1. The arbiter 103 further allocates the resource of the at least one slave device S1 to the at least one master device M1 based on relevant setting parameter transmitted from the arbiter parameter generating module 101.

Specifically, when the program PG1 of the arbiter parameter generating module 101 is executed, the processing unit 101P is caused to retrieve master device resource information 90 associated with the at least one master device M1, and retrieve slave device performance information 80 associated with the at least one slave device S1. Then, the processing unit 101P determines the at least one arbiter setting parameter 100 based on a neural network model NN1 stored in the storage unit 101S according to the master device resource information 90 and the slave device performance information 80.

Accordingly, since the arbiter parameter generating module 101 and the arbiter 103 are electrically connected via the data transmission interface (not shown), the arbiter parameter generating module 101 can send the at least one arbiter setting parameter 100 to the arbiter 103 via the data transmission interface. In this way, the arbiter 103 can determine the resource allocation setting of the at least one master device M1 based on the at least one arbiter setting parameter 100. In other words, the arbiter 103 determines an order in which the at least one master device M1 accesses the at least one slave device S1 based on the at least one arbiter setting parameter 100.

It should be noted that the neural network model NN1 is primarily trained to use the master device resource information and the slave device performance information as the input, and then output a corresponding arbiter setting parameter. In detail, during the training process of the neural network model NN1, a plurality of data is used to train the neural network model NN1. Each set of data includes the master device resource information during a specific time interval, the slave device performance information during the same time interval, and the arbiter setting parameter used by the arbiter 103 during the same time interval.

More specifically, for example, for the master device resource information, the slave device performance information and the arbiter setting parameter of the same set of data, when the arbiter 103 uses the arbiter setting parameter to allocate the resource of the slave device to the master device based on the master device resource information of the master device, the slave device may have the corresponding slave device performance information.

Thereafter, the master device resource information and the slave device performance information are fed back into the neural network model NN1, whereas the neural network model NN can use the same to calculate and update the arbiter setting parameter, in an attempt to improve the slave device performance information of the slave device.

Figure 2A:
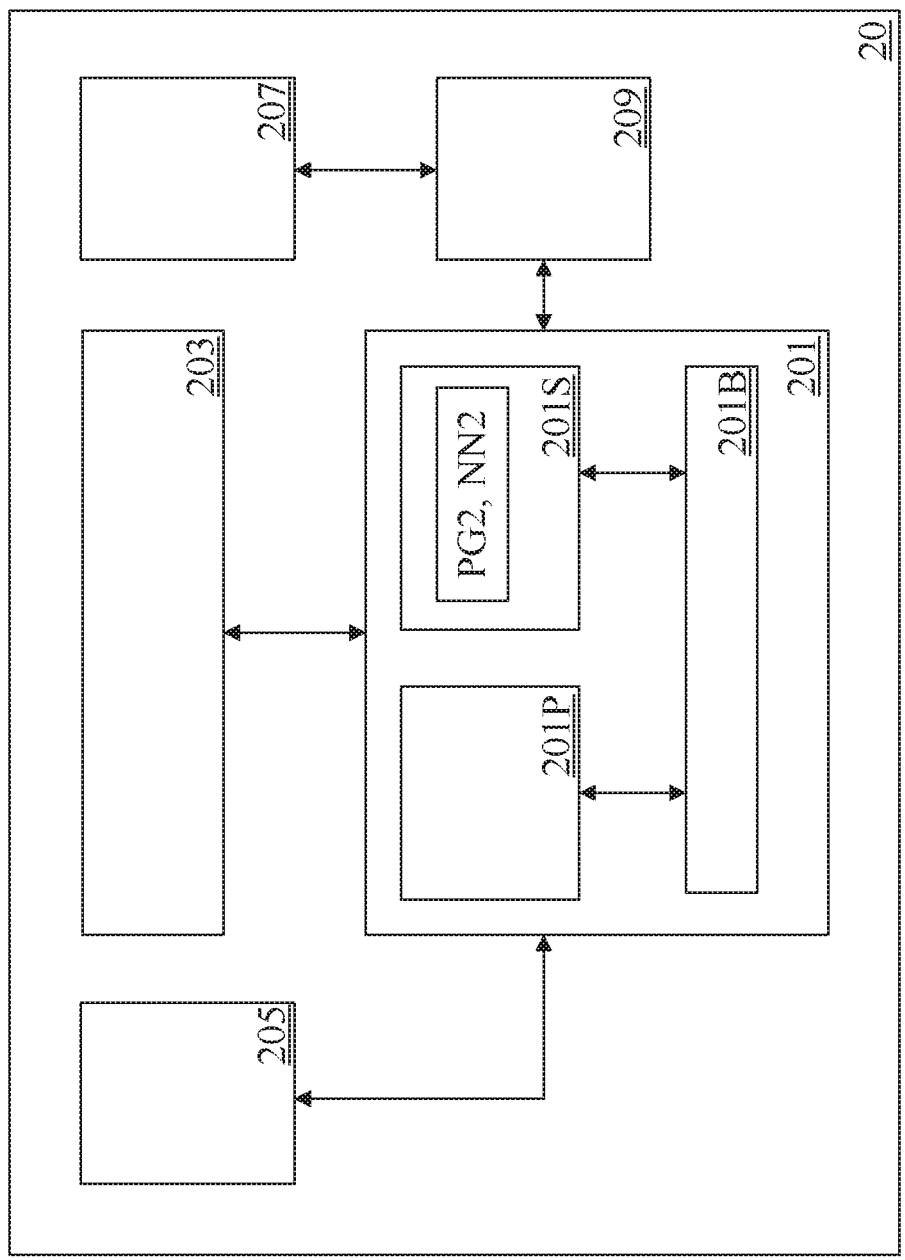
FIG. 2A is a block diagram of a data transmission system according to some embodiments of the present invention.

In some embodiments, the present invention provides a data transmission system 20. Please refer to FIG. 2A, which is a block diagram of the data transmission system 20 according to some embodiments of the present invention. The data transmission system 20 includes an arbiter parameter generating module 201, an arbiter 203, a master device monitor 205, a slave device monitor 207, and a slave device performance calculation unit 209. In this case, the arbiter parameter generating module 201, the arbiter 203, the master device monitor 205, the slave device monitor 207 and the slave device performance calculation unit 209 are electrically connected via a data transmission interface.

The arbiter parameter generating module 201 includes a processing unit 201P and a storage unit 201S. The processing unit 201P and storage unit 201S are electrically connected via a bus 201B. By the bus 201B, the processing unit 201P can execute a program PG2 stored in the storage unit 201S. The execution of the program PG2 causes the processing unit 201P to execute the function of dynamic resource allocation. The relevant function of dynamic resource allocation is discussed further below.

Figure 2B:
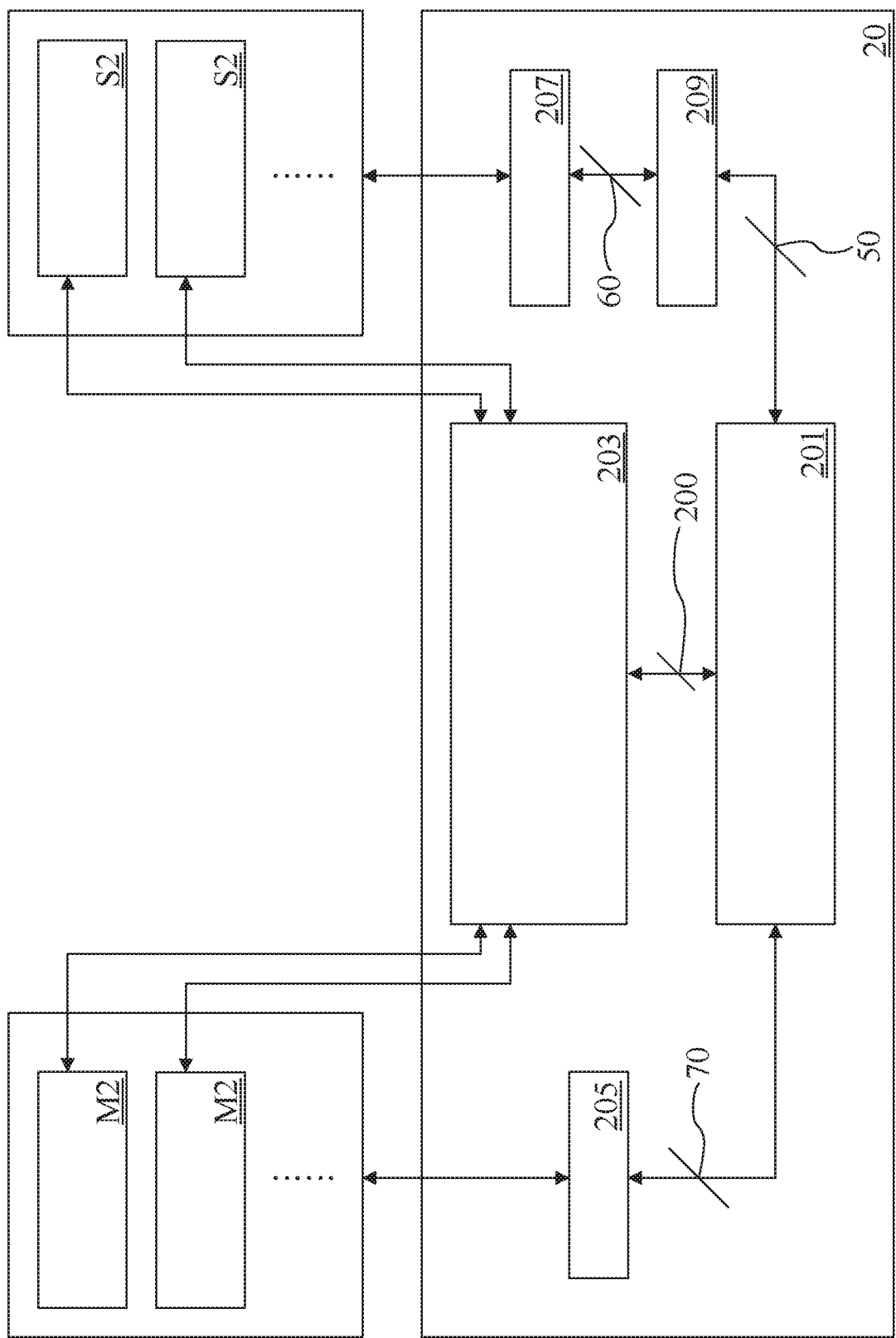
FIG. 2B is a schematic diagram illustrating operations of a data transmission system according to some embodiments of the present invention.

Please refer to FIG. 2B, which is a schematic diagram illustrating the operations of the data transmission system 20. As shown in the drawing, the arbiter 203 of the data transmission system 20 is electrically connected to a plurality of master devices M2 and a plurality of slave devices S2 via a data transmission interface (not shown). The arbiter 203 allocates the resource of one slave devices S2 to the master devices M2 based on relevant setting parameter sent by the arbiter parameter generating module 201.

Specifically, the master device monitor 205 is electrically connected to the plurality of master devices M2 via a data transmission interface (not shown), and is configured to monitor the master devices M2 so as to generate master device resource information 70. In this case, the master device resource information 70 includes the bandwidth requirement information of each master device M2 and a tolerance value of access time of each master device M2. The bandwidth requirement information is mainly associated with the master device M2's requirement regarding the data bandwidth, whereas the tolerance value of access time is mainly associated with the master device M2's maximum tolerance value to the time consumed by the access operation.

On the other hand, the slave device monitor 207 is electrically connected to the plurality of slave devices S2 via the data transmission interface, and is configured to monitor the slave devices S2 so as to generate slave device resource information 60. In this case, the slave device resource information 60 includes a total access bandwidth of each slave device S2, a maximum access completion time of each slave device S2 for each master device M2, and an average access completion time of each slave device S2 for each master device M2.

The total access bandwidth is mainly associated with the total access bandwidth provided by the slave devices S2, the maximum access completion time is mainly associated with the maximum time spent by the slave devices S2 for completing all access operations of each master device M2, and the average access completion time is mainly associated with average time spent by the slave devices S2 for completing all access operations of each master device M2.

Then, the slave device performance calculation unit 209 calculates slave device performance information 50 of the slave device S2 according to the slave device resource information 60. Specifically, the slave device performance calculation unit 209 has stored therein a plurality of weights respectively corresponding to the total access bandwidth, the maximum access completion time and the average access completion time of the slave device resource information 60.

Accordingly, the slave device performance calculation unit 209 can calculate the slave device performance information 50 according to the total access bandwidth and its weight, the maximum access completion time and its weight, and the average access completion time and their weights. In some embodiments, sum of the weights corresponding to the total access bandwidth, the maximum access completion time and the average access completion time is 1. The slave device performance information 50 can be sum of product of the total access bandwidth and its weight, product of the maximum access completion time and its weight, and product of the average access completion time and its weight. In some embodiments, the slave device performance information 50 includes quantized information, such as scores or percentages, wherein the higher the value, the better the performance of the master device M2 in accessing the slave device S2.

Then, when the program PG2 of the arbiter parameter generating module 201 is executed, the processing unit 201P is caused to retrieve the master device resource information 70 from the master device monitor 205 periodically, and to receive the slave device performance information 50 from the slave device performance calculation unit 209 periodically. Thereafter, the processing unit 201P determines the at least one arbiter setting parameter 200 based on a neural network model NN2 stored in the storage unit 201S according to the master device resource information 70 and the slave device performance information 50. In this case, the at least one arbiter setting parameter 200 includes an access priority parameter.

Accordingly, since the arbiter parameter generating module 201 and the arbiter 203 are electrically connected via a data transmission interface (not shown), the arbiter parameter generating module 201 can send at least one arbiter setting parameter 200 to the arbiter 203 via the data transmission interface. In this way, the arbiter 203 can determine the resource allocation setting of the master device M2 based on the access priority parameter included in the at least one arbiter setting parameter. In other words, the arbiter 203 determines the order in which each master device M2 accesses the slave device S2 based on the access priority parameter.

It should be noted that the neural network model NN2 is primarily trained to use the master device resource information (i.e., the bandwidth requirement information and the tolerance value of access time of the master device) and the slave device performance information (calculated from the total access bandwidth, the maximum access completion time, the average access completion time, and corresponding weights of the slave device) as the input, and then output a corresponding arbiter setting parameter.

In detail, during the training process of the neural network model NN2, a plurality of data is used to train the neural network model NN2. Each set of data includes the bandwidth requirement information and the tolerance value of access time of the master device during a specific time interval, the slave device performance information during the same time interval, and the arbiter setting parameter used by the arbiter 203 during the same time interval.

More specifically, for the same set of data of the bandwidth requirement information and the tolerance value of access time of the master device, the slave device performance information and the arbiter setting parameter, when the arbiter 203 uses the arbiter setting parameter to allocate the resource of the slave device to the master device based on the bandwidth requirement information and the tolerance value of access time of the master device, the slave device performance calculation unit 209 may calculate the slave device performance information of the slave device according to the total access bandwidth, the maximum access completion time, the average access completion time and the corresponding weights of the slave device.

Subsequently, the bandwidth requirement information and the tolerance value of access time of the master device and the slave device performance information are fed back into the neural network model NN2, so that the neural network model NN2 can calculate and update the arbiter setting parameter accordingly in an attempt to improve the slave device performance information of the slave device.

In some embodiments, when the program PG2 of the arbiter parameter generating module 201 is executed, the processing unit 201P is caused to automatically adjust the weights used in the neural network model NN2, so that the neural network model NN2 carries out an optimal self-learning.

Specifically, after the master device resource information (the bandwidth requirement information and the tolerance value of access time of the master device) and the slave device performance information are fed back into the neural network model NN2, the arbiter parameter generating module 201 ascertains the slave device performance information generated by the weights corresponding to the master device resource information (the bandwidth requirement information and the tolerance value of access time of the master device). For example, after the corresponding master device resource information Data Set A and the slave device performance information Data Set B are fed back into the neural network model NN2, the arbiter parameter generating module 201 can derive that the slave device performance information Data Set B is generated according to the operation of the master device resource information Data Set A in connection with the weight Data Set W.

Then, the arbiter parameter generating module 201 can automatically adjust the weights (the weights corresponding to the bandwidth requirement information and the tolerance value of access time of the master device) used by the neural network model NN2, according to different network environment parameters, in an attempt to obtain a higher slave device performance information. For example, when a custom quantized slave device performance information score of 85 is generated based on the bandwidth requirement information (corresponding to weight 0.7) and the tolerance value of access time (corresponding to weight 0.3) of the master device, the arbiter parameter generating module 201 can adjust the ratio of the weights of 0.7 and 0.3 (for example, adjusting the weight of the bandwidth requirement information to 0.8, and adjusting the weight of the tolerance value of access time to 0.2) according to different network environment parameters, in an attempt to obtain a slave device performance information higher than 85 (e.g., 90) in subsequent operations.

In this way, by iteratively adjusting the weights in an attempt to increase the slave device performance information, the arbiter setting parameter of the neural network model NN2 of the arbiter parameter generating module 201 can be optimized. In other words, by use of the above-mentioned self-learning operations, the arbiter setting parameter of the adjusted neural network model NN2 shall increase the score of the slave device performance information.

Figure 3:
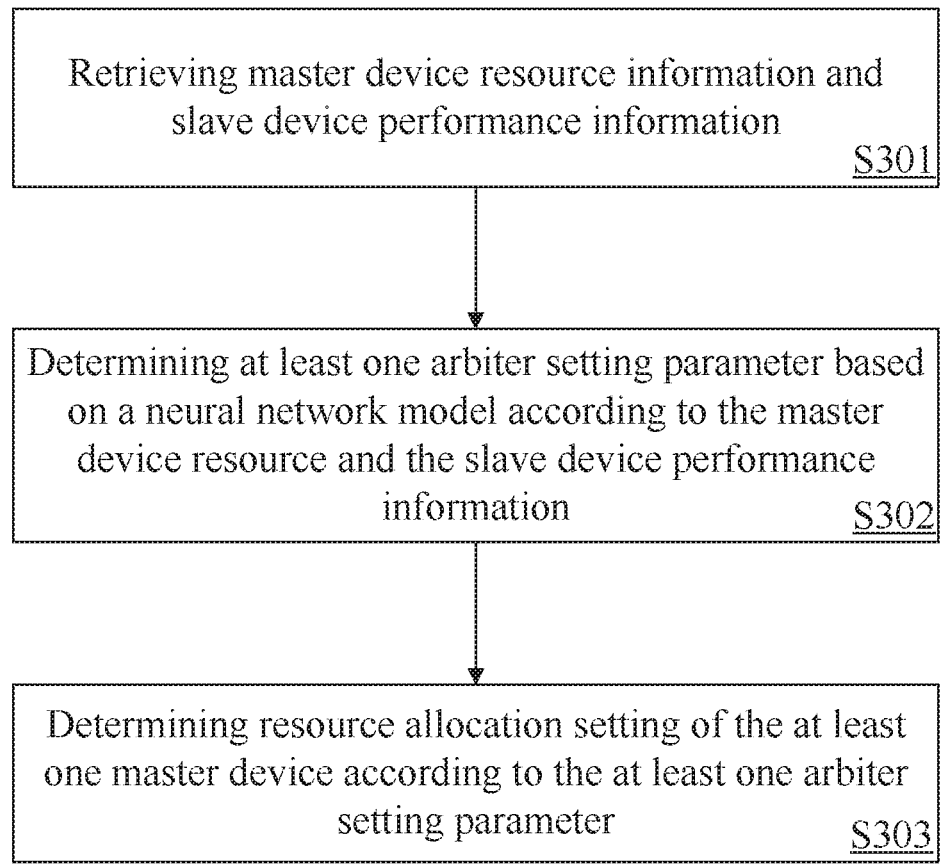
FIG. 3 is a flowchart diagram of a resource allocation method according to some embodiments of the present invention.

Some embodiments of the present invention include a resource allocation method, and a flow chart thereof is shown in FIG. 3. The resource allocation method of these embodiments is implemented by a data transmission system (such as the data transmission system 10 of the above-mentioned embodiments). Detailed operations of the method are discussed below.

First, step S301 is executed to retrieve master device resource information and slave device performance information. Then, step S302 is executed to determine at least one arbiter setting parameter based on a neural network model according to the master device resource information and the slave device performance information. Specifically, the neural network model receives the master device resource information and the slave device performance information as the input, and outputs the at least one arbiter setting parameter. Step S303 is executed to determine resource allocation setting of the at least one master device according to the at least one arbiter setting parameter. In other words, the order in which the at least one master device accesses the at least one slave device is determined according to the at least one arbiter setting parameter.

Figure 4A:
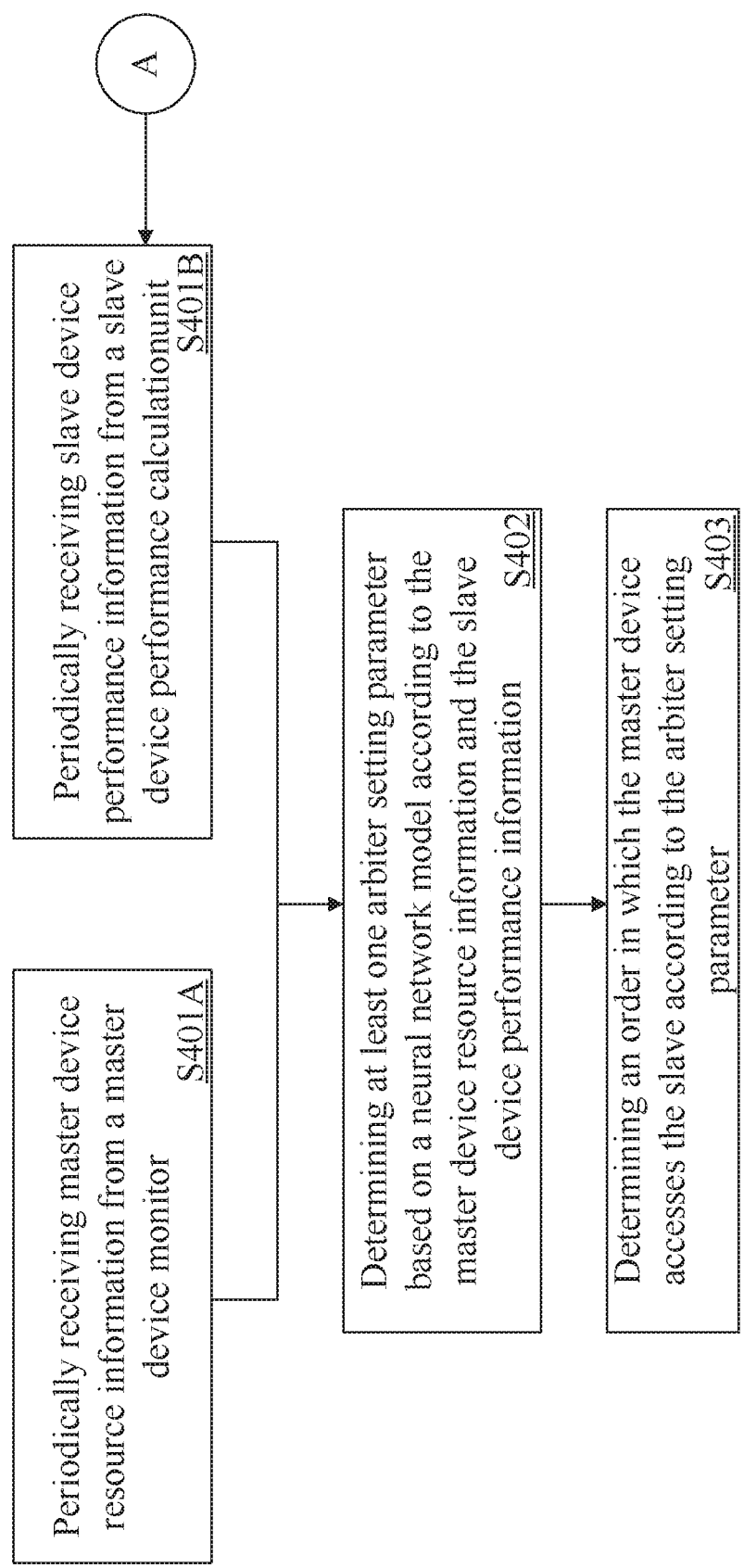
FIGS. 4A to 4B are flowchart diagrams of a resource allocation method according to some embodiments of the present invention.
Figure 4B:
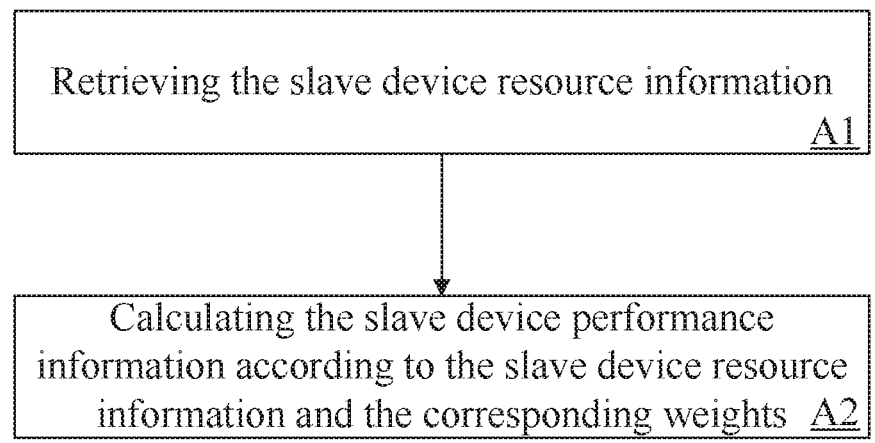

Some embodiments of the present invention include a resource allocation method, and a flow chart thereof is shown in FIGS. 4A and 4B. The resource allocation method of these embodiments is implemented by a data transmission system (such as the data transmission system 20 of the above-mentioned embodiments). Detailed operations of the method are discussed below.

First, step S401A and step S401B are executed. In this case, the master device resource information includes a bandwidth requirement information and a tolerance value of access time. Step S401A is executed to periodically receive master device resource information from a master device monitor. Step S401B is executed to periodically receive slave device performance information from a slave device performance calculation unit. In some embodiments, the master device resource information includes the bandwidth requirement information and the tolerance value of access time of a plurality of master devices.

It should be noted that, in some embodiments, the slave device performance information is calculated in step A. Please refer to FIG. 4B, in which step A includes step A1 and step A2. Specifically, step A1 is executed to retrieve the slave device resource information. In this case, the slave device resource information can be received from a slave device monitor configured to monitor a plurality of slave devices. The slave device resource information includes a total access bandwidth, a maximum access completion time and an average access completion time associated with the plurality of slave devices.

In some embodiments, each of the total access bandwidth, the maximum access completion time and the average access completion time has a corresponding weight. Accordingly, step A2 is executed to calculate the slave device performance information according to the slave device resource information and the corresponding weights. In other words, the slave device performance information is calculated according to the total access bandwidth and its weight, the maximum access completion time and its weight, and the average access completion time and its weight associated with the plurality of slave devices.

After retrieving the master device resource information and the slave device performance information, step S402 is executed to determine at least one arbiter setting parameter based on a neural network model according to the master device resource information and the slave device performance information. In this case, the at least one arbiter setting parameter includes an access priority parameter. Thereafter, Step S403 is executed to determine an order in which the master devices access the slave devices according to the arbiter setting parameter.

It should be noted that in some embodiments, the master device includes computing device (e.g., central processing unit, graphic processing unit, etc.), the slave device includes memory device (e.g., RAM, DDR-SRAM, etc.); however, this is not a limitation to the embodiments of the implementations of the hardware components of the present invention.

This invention described above may be implemented as appropriate hardware component, software component, and/or combination of hardware components and software components. At least part of this invention can be optionally implemented as software which is running on one or more data processors, digital signal processors or configurable module elements (e.g., Field Programmable Gate Arrays).

While this invention has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the invention by simply employing the elements of the independent claims. Accordingly, embodiments of the invention as set forth herein are intended to be illustrative, not limiting. Various changes may be made without departing from the spirit and scope of the invention.

What is claimed is:

1. A resource allocation method, including:
retrieving first master device resource information associated with at least one master device and first slave device performance information associated with at least one slave device;
determining at least one first arbiter setting parameter based on a neural network model according to the first master device resource information and the first slave device performance information, wherein the neural network model is trained by a plurality data, and each data includes a second master device resource information during a time interval, a second slave device performance information during the time interval, and a second arbiter setting parameter during the time interval; and
determining an order in which the at least one master device accesses the at least one slave device according to the at least one first arbiter setting parameter.

2. The resource allocation method of claim 1, wherein retrieving the first master device resource information and the first slave device performance information further includes:
receiving the first master device resource information from a master device monitor periodically; and
receiving the first slave device performance information from a slave device performance calculation unit periodically.

3. The resource allocation method of claim 2, wherein the first master device resource information includes a bandwidth requirement information and a tolerance value of access time.

4. The resource allocation method of claim 2, further including:
retrieving a slave device resource information associated with the at least one slave device; and
calculating the first slave device performance information according to the slave device resource information.

5. The resource allocation method of claim 4, wherein the slave device resource information includes: a total access bandwidth, a maximum access completion time and an average access completion time.

6. The resource allocation method of claim 5, wherein each of the total access bandwidth, the maximum access completion time and the average access completion time has a corresponding weight, and calculating the first slave device performance information according to the slave device resource information further includes:
  calculating the first slave device performance information according to the total access bandwidth, the maximum access completion time, the average access completion time and the corresponding weights.

7. The resource allocation method of claim 6, wherein sum of the corresponding weights of the total access bandwidth, the maximum access completion time and the average access completion time is 1.

8. The resource allocation method of claim 1, wherein the at least one first arbiter setting parameter includes an access priority parameter, and determining the order in which the at least one master device accesses the at least one slave device further includes:
  determining the order in which the at least one master device accesses the at least one slave device according to the access priority parameter.

9. The resource allocation method of claim 1, wherein the at least one master device includes a computing device.

10. The resource allocation method of claim 1, wherein the at least one slave device includes a memory device.

11. A data transmission system, including:
  an arbiter parameter generating module, including:
  a processing unit; and
  a storage unit, configured to store a neural network model and a program, wherein the program, upon execution, causes the processing unit to:
    retrieve first master device resource information associated with at least one master device and first slave device performance information associated with at least one slave device; and
    determine at least one first arbiter setting parameter based on a neural network model according to the first master device resource information and the first slave device performance information, wherein the neural network model is trained by a plurality data, and each data includes a second master device resource information during a time interval, a second slave device performance information during the time interval, and a second arbiter setting parameter during the time interval; and
  an arbiter, electrically connected to the arbiter parameter generating module, and configured to determine an order in which the at least one master device accesses the at least one slave device according to the at least one first arbiter setting parameter.

12. The data transmission system of claim 11, further including:
  a master device monitor, configured to monitor the at least one master device and to generate the first master device resource information;
  a slave device performance calculating unit, configured to calculate the first slave device performance information of the at least one slave device;
  wherein, the program, upon execution, further causes the processing unit to,
    receive the first master device resource information from the master device monitor periodically; and
    receive the first slave device performance information from the slave device performance calculation unit periodically.

13. The data transmission system of claim 12, wherein, the first master device resource information includes: a bandwidth requirement information and a tolerance value of access time.

14. The data transmission system of claim 12, further including:
  a slave device monitor, configured to monitor the at least one slave device and to generate a slave device resource information;
  wherein, the slave device performance calculation unit calculates the first slave device performance information of the at least one slave device according to the slave device resource information.

15. The data transmission system of claim 14, wherein the slave device resource information includes a total access bandwidth, a maximum access completion time and an average access completion time.

16. The data transmission system of claim 15, wherein each of the total access bandwidth, the maximum access completion time and the average access completion time has a corresponding weight, and the slave device performance calculation unit calculates the first slave device performance information according to the total access bandwidth, the maximum access completion time, the average access completion time and the corresponding weights.

17. The data transmission system of claim 16, wherein sum of the corresponding weights of the total access bandwidth, the maximum access completion time and the average access completion time is 1.

18. The data transmission system of claim 11, wherein the at least one first arbiter setting parameter includes an access priority parameter, and the arbiter determines the order in which the at least one master device accesses the at least one slave device according to the access priority parameter.

19. The data transmission system of claim 11, wherein the at least one master device includes a computing device.

20. The data transmission system of claim 11, wherein the at least one slave device includes a memory device.

* * * * *